UNITED STATES PATENT OFFICE 2,029,555

AZODYESTUFFS

José Stephen Petrus-Blumberger, Delft, Netherlands, assignor to General Aniline Works, Inc., New York, N. Y., a corporation of Delaware No Drawing. Application April 12, 1932, Serial No. 604,881. In Germany April 20, 1931

6 Claims. (Cl. 260—82)

The present invention relates to new azodyestuffs, more particularly it relates to dyestuffs which may be represented by the probable general formula:

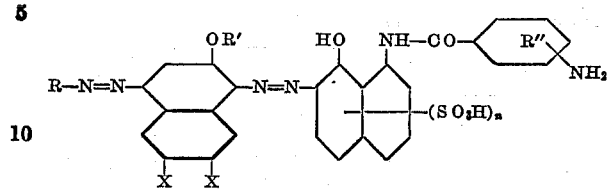

wherein R stands for a radical of the benzene or naphthalene series containing a sulfonic or a carboxylic acid group, one X stands for hydrogen and the other X stands for hydrogen or a sulfonic acid group, R' stands for alkyl, such as methyl, ethyl, hydroxyethyl, propyl, isopropyl, n stands for the numbers one or two, and wherein the benzene nucleus R'' may be substituted by halogen, alkyl or alkoxy.

My new dyestuffs are obtainable by diazotizing in the usual manner a primary amine of the benzene or naphthalene series containing a sulfonic or a carboxylic acid group and coupling with an 1-amino-2-naphtholalkylether or a 6- or 7-sulfonic acid thereof, further diazotizing and coupling with an 1-(aminobenzoylamino) 8-naphthol-mono- or disulfonic acid which may be substituted in the benzene nucleus of the benzoylamino group by alkyl, alkoxy or halogen, thereby effecting the final coupling with the addition of a base of the pyridine or quinoline series, such as picoline, quinaldine and preferably pyridine itself.

As initial components there may be mentioned by way of example, aminobenzoic acid, anilinesulfonic acid, 1-naphthylamine-4-sulfonic acid, 2-naphthylamine-8-sulfonic acid, p-toluidine-m-sulfonic acid, chloro-toluidine sulfonic acids, 2-anisidine-4-sulfonic acid (OCH₃=1), m-xylidine-m-sulfonic acid.

As final coupling components there may be mentioned by way of Example 1-p-aminobenzoylamino 8-naphthol-3,6- or -4,6-disulfonic acid, 1-(4'-methoxy-3'-aminobenzoylamino) 8 - naphthol-3,6- or -4,6-disulfonic or -4-monosulfonic acid, 1-(4'-methyl-3'-aminobenzoylamino) 3,6-disulfonic acid and 4'-chloro-3'-aminobenzoylamino-4,6-difulfonic acid.

My new dyestuffs are in form of their alkali metal salts generally dark watersoluble powders, dyeing the cellulosic fibre generally bluish shades which by diazotizing and developing with a yellow component, such as methylketol, acetoacetic acid arylamides, pyrazolones and the like, yield green shades of excellent clearness and good fastness properties.

The invention is illustrated by the following examples, without being limited thereto:

*Example 1.*—19,5 grams of the sodium salt of p-sulfanilic acid are diazotized in the usual manner and coupled in acetic acid solution with 27,5 grams of the sodium salt of 1-amino-2-ethoxynaphthalene-6-sulfonic acid. The monoazodyestuff formed is sucked off, dissolved in water to form a neutral solution, then 7 grams of sodium nitrite are added, the solution is cooled down to zero and 35 c.c.s. of hydrochloric acid of 19° Bé. are quickly added. When the diazotization is complete, the solution is passed into a mixture of 500 c.c.s. of water, 500 c.c.s. of pyridine, 300 grams of ice and containing dissolved 48,2 grams of 1-p-aminobenzoylamino-8-hydroxynaphthalene-3,6-sodium-disulfonate, while thoroughly stirring. The coupling is complete immediately the dyestuff is isolated by neutralization with hydrochloric acid. By redissolving from hot water and salting out it can be purified. In its free state it has probably the following formula:

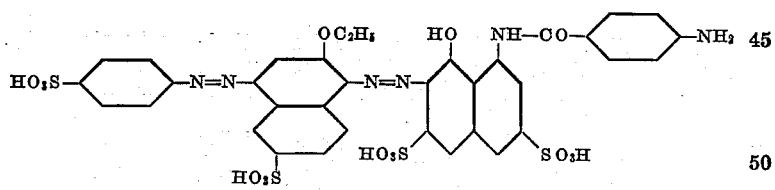

The sodium salt of the dyestuff is a dark powder, soluble in water with a blue coloration and in concentrated sulfuric acid with a greenish-black coloration. It dyes cotton blue shades, which by diazotization and developing with a yellow component yield clear green shades of good fastness and excellent discharge properties.

Dyestuffs of similar properties are obtained when substituting in the above described dyestuff the p-sulfanilic acid by 1-naphthylamine-4-sulfonic acid, anthranilic acid and dehydrothiotoluidine sulfonic acid and/or by substituting the 1-amino-2-ethoxynaphthalene-6-sulfonic acid by the corresponding methylether or the corresponding 7-sulfonic acid.

Example 2.—By diazotizing 24 grams of the sodium salt of 3-chloro-2-toluidine-5-sulfonic acid, coupling with 27,5 grams of the sodium salt of 1-amino-2-ethoxynaphthalene-6-sulfonic acid, further diazotizing and coupling with 1-p-aminobenzoylamino-8-napthol-3,6-disulfonic acid, analogously to the process described in Example 1, there is obtained a dyestuff having in its free state the following formula:

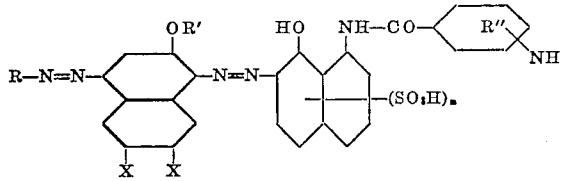

The sodium salt of the dyestuff is a dark powder, soluble in water with a greenish-blue and in concentrated sulfuric acid with an olive coloration. It dyes cotton greenish-blue shades, which by diazotization and developing with a yellow component yield clear green shades of good fastness and excellent discharge properties.

By substituting the 1-amino-2-naphtholethylether-6-sulfonic acid by an equivalent amount of 1-amino-2-naphtholethylether a dyestuff having similar properties is obtained.

Example 3.—By diazotizing 24,5 grams of the sodium salt of 2-naphthylamine-8-sulfonic acid, coupling with 27,5 grams of the sodium salt of 1-amino-2-ethoxynaphthalene-6-sulfonic acid, further diazotizing and coupling with 1-p-aminobenzolyamino-8-naphthol-3,6-disulfonic acid, analogously to the process described in Example 1, there is obtained a dyestuff having in its free state the following formula:

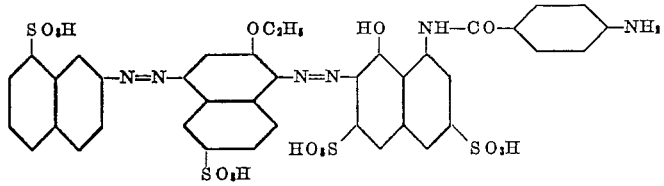

The sodium salt of the dyestuff is a dark powder, soluble in water with a bluish-green and in concentrated sulfuric acid with a blackish-olive coloration. It dyes cotton bluish-green shades, which by diazotization and development with a yellow component yield clear green shades of good fastness and excellent discharge properties.

I claim:

1. The new azodyestuffs of the general formula:

wherein "R" stands for a radical of the benzene or naphthalene series containing a sulfonic or carboxylic acid group, one X stands for hydrogen and the other X stands for hydrogen or a sulfonic acid group, R' stands for alkyl, n stands for one of the numbers one and two, and wherein the benzene nucleus R" may be further substituted by substituents selected from the group consisting of halogen, alkyl and alkoxy, being in form of their alkali metal salts dark, water soluble powders, dyeing the cellulosic fibre generally bluish shades, which by diazotizing and developing with a yellow component yield green shades of excellent clearness and good fastness properties.

2. The new azodyestuffs of the general formula:

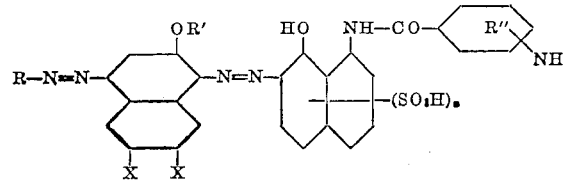

wherein "R" stands for a benzene or napthalene nucleus which is substituted by substituents selected from the group consisting of the sulfonic acid group and the carboxylic acid group and which may be further substituted by substituents selected from the group consisting of alkyl, alkoxy and nitro, one X stands for hydrogen and the other X stands for hydrogen or a sulfonic acid group, R' stands for alkyl, n stands for one of the numbers one and two, and wherein the benzene nucleus R" may be further substituted by substituents selected from the group consisting of halogen, alkyl and alkoxy, being in form of their alkali metal salts dark, watersoluble powders, dyeing the cellulosic fibre generally bluish shades,

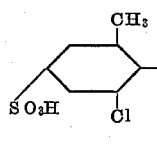

which by diazotizing and developing with a yellow component yield green shades of excellent clearness and good fastness properties.

3. The new azodyestuffs of the general formula:

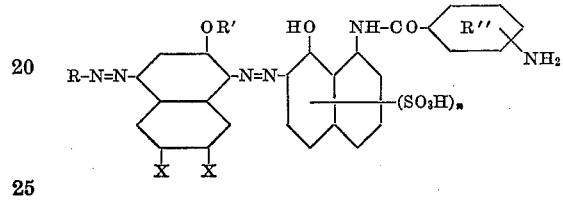

wherein "R" stands for a benzene or napthalene nucleus which is substituted by substituents selected from the group consisting of the sulfonic acid group and the carboxylic acid group and which may be further substituted by substituents selected from the group consisting of alkyl, alkoxy and nitro, one X stands for hydrogen and the other X stands for hydrogen or a sulfonic acid group, R' stands for a methyl or ethyl group, $n$ stands for one of the numbers one and two, and wherein the benzene nucleus R'' may be further substituted by substituents selected from the group consisting of halogen, alkyl and alkoxy, being in form of their alkali metal salts dark, watersoluble powders, dyeing the cellulosic fibre generally bluish shades, which by diazotizing and developing with a yellow component yield green shades of excellent clearness and good fastness properties.

4. The new azodyestuff of the folowing formula:

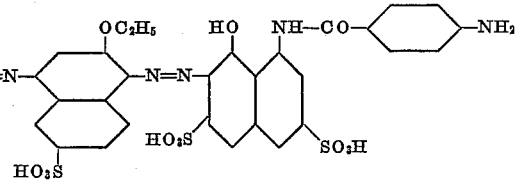

being in form of its alkali metal salts a dark powder, soluble in water with a greenish-blue and in concentrated sulfuric acid with an olive coloration and dyeing cotton greenish-blue shades, which by diazotization and developing with a yellow component yield clear green shades of good fastness and excellent discharge properties.

5. The azodyestuff of the following formula:

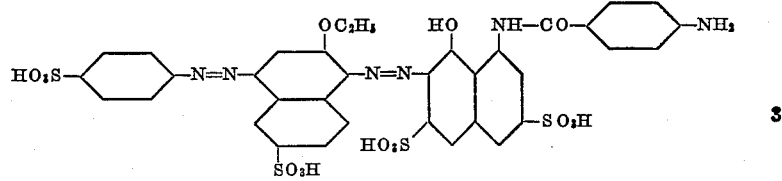

being in form of its alkali metal salts a dark powder, soluble in water with a blue coloration and in concentrated sulfuric acid with a greenish-black coloration, and dyeing cotton blue shades, which by diazotiation and developing with a yellow component yield clear green shades of good fastness and excellent discharge properties.

6. The azodyestuff of the following formula:

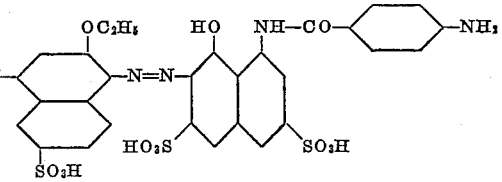

being in form of its alkali metal salts a dark powder, soluble in water with a bluish-green and in concentrated sulfuric acid with a blackish-olive coloration, and dyeing cotton bluish-green shades, which by diazotization and development with a yellow component yield clear green shades of good fastness and excellent discharge properties.

JOSÉ STEPHEN PETRUS-BLUMBERGER.